Oct. 12, 1965       J. R. SWEENEY       3,211,234
WELL SCREEN
Filed Nov. 6, 1963
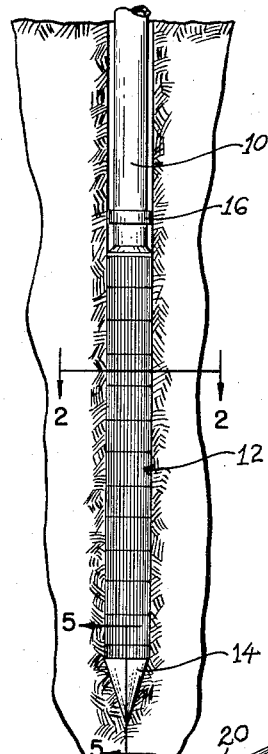
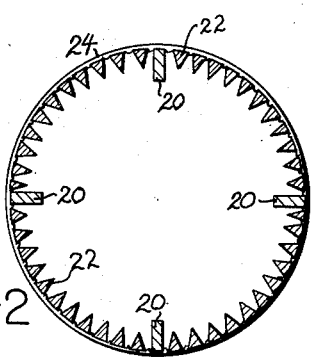
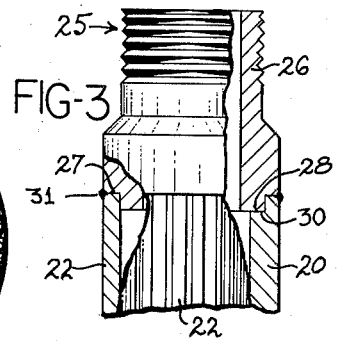
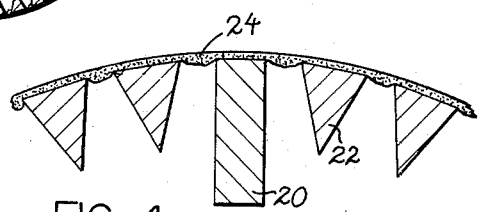
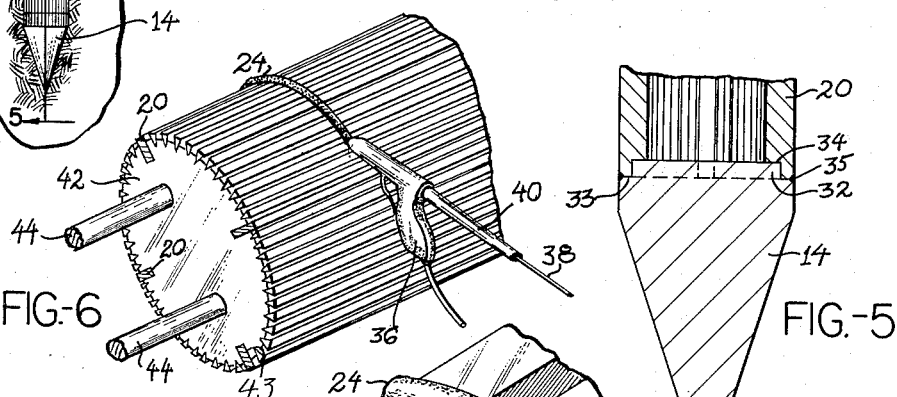
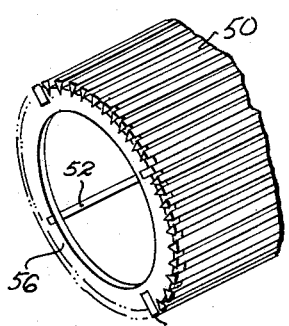
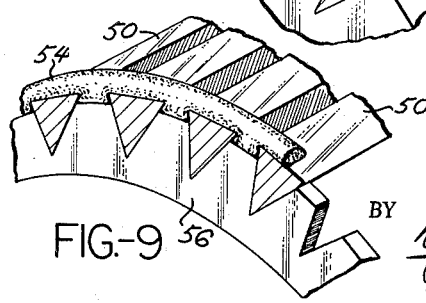
INVENTOR.
JAMES R. SWEENEY
BY
HIS ATTORNEYS United States Patent Office 3,211,234
Patented Oct. 12, 1965

3,211,234
WELL SCREEN
James R. Sweeney, Galesburg, Ill., assignor to Bixby-Zimmer Engineering Company, Galesburg, Ill., a partnership
Filed Nov. 6, 1963, Ser. No. 321,926
8 Claims. (Cl. 166—234)

This invention relates to screen structures and more particularly to cylindrical screen structures having axially disposed wire elements at the surface thereof defining axially extending slots. However, the invention is not necessarily so limited.

Without intending to imply a limitation to the range of applications for the present invention, the invention is described herein as embodied in well screens. Well screens are tubular screen elements which are attached to the lower end of a well pipe and immersed into a water-bearing formation. The screen, being porous, permits water to seep into its interior from where it can be drawn up the well pipe by a suitable pumping device. The porosity of the screen is regulated to exclude large particles of sand and gravel from the interior of the screen, while at the same time permitting finer particles of slit and sand to enter the screen. The transmission of fine particles of silt and sand into the screen aids in the development of the well formation in that the removal of fine particles of sand and silt from the sand and gravel surrounding the screen in the initial development of the well establishes an area surrounding the well screen through which water flows freely. Thus, proper development of the water-bearing formation through the aid of a properly designed well screen creates a reservoir substantially larger than the screen itself from which clear water can be withdrawn.

In order to place the well screen in proper position for performance of its function it is necessary to drive the well screen into the water-bearing formation. This requires a screen which can withstand substantial axial compression. It also requires a screen that will not become clogged as it is advanced axially into the water-bearing formation. Obviously, if the screen becomes clogged to a significant degree when initially driven into position, it will be incapable of performing the functions required for proper development of the well.

An object of the present invention is to provide a new and improved screen.

Another object of the present invention is to provide a well screen which resists clogging on being advanced into a water-bearing formation.

Still another object of the present invention is to provide a new and improved well screen having a porosity established by axially extending wire elements and having improved means for shielding and supporting the wire elements against excessive loads.

Other objects and advantages reside in the construction of parts, the combination thereof, the method of manufacture and the mode of operation, as will become more apparent from the following decription.

In the drawing:

FIGURE 1 is a sectional view taken through a water-bearing formation and illustrating the installation of a well screen embodying the present invention.

FIGURE 2 is an enlarged sectional view taken substantially along the line 2—2 of FIGURE 1.

FIGURE 3 is an enlarged fragmentary view with portions broken away illustrating one end of the well screen of FIGURE 1.

FIGURE 4 is an enlarged fragmentary view of a portion of the well screen taken along the section illustrated in FIGURE 2.

FIGURE 5 is an enlarged sectional view of the lower end of the well screen of FIGURE 1 taken along the line 5—5 of FIGURE 1.

FIGURE 6 is an enlarged fragmentary perspective view illustrating one step in the construction of a screen such as the well screen illustrated in FIGURE 1.

FIGURE 7 is a greatly enlarged sectional view illustrating the formation of a weld ribbon connecting the wire elements of the screen of FIGURE 6.

FIGURE 8 is a fragmentary perspective view illustrating the assembly of a modification.

FIGURE 9 is an enlarged sectional view of the modification illustrating the formation of a weld ribbon connecting the wire elements of the screen to a support therefor.

Referring to the drawing in greater detail, FIGURE 1 illustrates a well installation wherein a well pipe or casing 10 is provided at the lower end thereof with a well screen 12 terminating with a driving point 14. As is well understood by those skilled in the art the installation of FIGURE 1 is accomplished by driving the well pipe downwardly into the water-bearing formation until the well screen has reached its desired depth.

The structural features of the well screen are best illustrated in FIGURES 2 through 5. As can be observed in these figures the outer surface of the well screen is established by a plurality of axially extending support bars 20 disposed in circumferentially spaced relation and by groups of axially extending wire elements 22 disposed in spaced relationship within the peripheral sectors between the support bars 20. Thus, four support bars 20 are shown dividing the periphery of the well screen into four quadrants, each of which is subdivided by a plurality of the wire elements 22.

Preferably, the wire elements 22 have a triangular cross-section, as shown, such that the slots between adjacent wire elements and between adjacent wire elements and support bars diverge toward the interior of the screen.

It will be noted that the support bars illustrated have substantially the same thickness as the side width of the wire elements and accordingly constitute wire elements of an extended radial dimension. However, it is not intended by this illustration to limit the configuration of the support bars to such shape or dimension.

The support bars 20 and parallel wire elements 22 are integrally joined at their outer periphery by means of weld ribbons 24 disposed in axially spaced relation along the outer periphery of the well screen. As best seen in FIGURE 1 the ribbons 24 are relatively thin in relation to the overall length of the screen. Thus, while these ribbons interrupt the axial continuity of the slots that exist between the wire elements 22, the separation between the ribbons is sufficient that the axial length of these openings remains quite large in relation to the width of the openings.

The screen assembly as thus far described comprises an open ended tube having axially extending slots in its outer periphery. The attachment of appropriate end fittings to the tubular screen is illustrated in FIGURES 3 and 5. FIGURE 3 illustrates an end fitting 25 having an externally threaded sleeve 26 at one end thereof adapted to engage in a collar 16 for attachment to the well pipe 10. At the opposite end the fitting is provided with a peripheral surface 27 occupying a plane normal to the axis of the fitting. Inwardly of the surface 27 is an axially projecting shoulder 28 adapted to fit into the well screen.

For receipt of the shoulder 28 the support bars 20 in the screen are notched in the inner margin thereof as illustrated at 30, the notches 30 having the effect of reducing the radial thickness of the support bars 20 at the ends thereof to substantially the radial thickness of the wire elements 22.

As can be seen in FIGURE 3 the notches 30 in the support bars 20 permit the shoulder 28 on the fitting to project a short distance into the interior of the tubular screen assembly and permit the adjacent ends of the support bars 20 and wire elements 22 to contact the surface 27 of the fitting. A weld ribbon 31 similar to the ribbon illustrated at 24 is applied circumferentially around the juncture between the surface 27 and the ends of the wire elements 22 and support bars 20 to firmly secure the screen to the fitting.

A welded connection of this nature suffices for most purposes since the well screen illustrated is subjected primarily to axial compression loads. For applications where a stronger welded joint is required the support bars 20 are welded to the fitting at all points of contact therebetween.

It will be noted that the surface 27 of the fitting 25 shields the ends of the wire elements 22 and at the same time the outer periphery of the shoulder 28 braces the ends of the wire elements 22 against radial loads.

FIGURE 5 illustrates the assembly of the driving point 14 to the opposite end of the well screen. For this assembly the driving point 14 is provided with a peripheral surface portion 33 and an axially extending boss 32 establishing a shoulder located inwardly of the surface 33. The width of the surface 33 corresponds to the radial thickness of the wire elements 22, such that the ends of these elements are shielded. For receipt of the boss 32 in the tubular screen assembly the support bars 20, which have a radial thickness greater than that of the wire elements, are notched as illustrated at 34. As with the fitting 25, previously described, a weld ribbon 35 is drawn around the periphery of the drive point 14 at the interface between the surface 33 and the ends of the support bars 20 and wires 22 so as to fixedly anchor the drive point to the screen assembly. Here again, when necessary, the strength of this welded joint can be increased by welding all contacting surfaces of the support bars 20 to the drive points 14.

The means by which the screen elements are assembled into their tubular configuration is illustrated in FIGURES 6 and 7. The support bars 20 and wire elements 22 comprising the screen are assembled upon suitable jigs, such as the jig illustrated at 42, and secured in position by temporary bands, not illustrated. The jig 42 is simply a disc element divided into quadrants by radially extending slots 43 which receive the support bars 20. The periphery of the disc is also provided with spaced V-shaped notches adapted to receive and position the wire elements 22. The jig 42 is provided with axially extending control rods 44 which permit the jig to be moved axially through the interior of the screen.

The weld ribbons 24 are applied with an arc welding gun 36 of a commercially available type. In the operation of this welding gun an elongated wire of weld material is fed continuously through the gun to the work and, through the establishment of a potential difference between the gun and the work, an electrical arc is drawn. The arc, which may be shielded by a suitable shielding gas supplied to the welding gun through a conduit 40 coaxial with the welding wire 38, softens the weld material so that it may be deposited as a thin ribbon.

Preferably the weld ribbon 24 is applied directly over the jig 42 so that, as the weld ribbon is applied, the spacing between the wire elements and support bars forming the screen is accurately controlled. For application of successive ribbons the jig 42 is advanced axially through the assembly of wire elements and support bars so as to underly each ribbon as the ribbon is applied. FIGURE 7 illustrates the manner in which the ribbon 24 bridges the slots between the wire elements 22 without contacting the jig 42.

While the foregoing description relates to a well screen having a driving point 14 and therefore to a well screen which is forceably driven into the ground it is to be recognized that other types of fittings well known to those skilled in the art can be employed to produce well screens of modified characteristics. Thus, a fitting similar to the fitting 25 may be substituted for the driving point 14 and closed with a suitable cap to provide a conventional bail-type fitting. Similarly, a fitting such as the fitting 25 may be substituted for the driving point and attached to additional pipe so as to provide a well screen which is located between two sections of well pipe.

Regardless of the type of fitting employed, it will be recognized by those skilled in the art that the present screen construction is especially suited to use as a well screen due to the compression strength imparted to the screen by the support bars 20. Since these support bars are directly welded to the end fittings substantially all axial compression loads are taken off the individual wire elements 22. Also, by providing slots in the screen which extend axially it will be recognized that the slots are self-cleaning, as the well screen is driven axially into the water-bearing formation. By employing triangular wire elements, as shown, the material that can pass into the axially extending slots enters a region of increasing separation between the wire elements with the result that such particles do not become permanently lodged between the wire elements. Since the end fittings described herein shield the ends of the wire elements the well screen is free of the possibility that the wire elements will be bent or twisted as the screen is driven axially into the water-bearing formation.

For some applications, particularly where the screen is to be very long, it is found desirable to brace the screen against radial loads which might cause the wire elements 22 to collapse inwardly. For such applications, the modification of FIGURES 8 and 9 is employed. In this modification a screen formed of wire elements 50 and support bars 52 secured by weld ribbons 54 is assembled on annular rings 56 having an outer periphery matching the inner periphery of the tubular screen. With the rings 56 in place the weld ribbons 54 are applied in such manner that the ribbons directly contact the rings 56 and permanently lock these rings in position. This construction is accomplished without any substantial reduction in the open area of the well screen since the annular rings 56 are aligned with the weld ribbons 54.

While the present invention has been described with emphasis on the applicability of this invention to the well screen art, it is to be recognized that the screen construction disclosed herein has numerous other applications, such as the construction of intakes in lakes and reservoirs, strainers in oil field equipment, line filters and the like. It will also be recognized that, while triangular wire elements are illustrated, the beneficial qualities of the triangular shape can be obtained in varying degrees with other shapes, such as a circular shape, and for some applications simple rectangular shapes will suffice.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention I claim:

1. A well screen comprising, in combination: a plurality of elongate wire elements and means supporting said wire elements in a tubular array wherein said wire elements extend parallel to the longitudinal axis of said array and cooperate to define elongated axially extending slots in the outer surface of said array, said supporting means including a first fitting disposed at one end of said array and adapted for attachment to a well pipe and a second fitting disposed at the opposite end of said array and having surface means protecting the ends of said wire elements whereby said well screen may be advanced axially, with said opposite end leading the advance, into the medium in which a well is located without damage to the ends of said wire elements, said wire elements due to their axial disposition with respect to the direction of advance permitting material to flow relatively along the outer surface of said tubular array without substantial obstruction from the wire elements of said array and without substantial clogging or blinding of the slots between said wire elements, a portion of said wire elements having an extended thickness in the direction normal to the outer surface of said array, the ends of said portion of wire elements being fixedly attached to said first and second fittings and said portion of wire elements cooperating with said fittings to shield the remainder of said wire elements from axial compression forces, an annular ring disposed in the interior of said tubular array and occupying a plane substantially normal to the axis of said array, said annular ring having a plurality of radially extending slots in the outer periphery thereof, there being one said radially extending slot receiving the extended thickness of each of said portion of wire elements, the outer periphery of said annular ring intermediate said radially extending slots contacting each of the remainder of said wire elements so as to brace said remaining wire elements against radially inward loads.

2. A well screen according to claim 1 wherein the periphery of said annular ring intermediate the radially extending slots therein has a plurality of circumferentially spaced notches, there being one notch receiving each of said remaining wire elements and thereby fixing the separation between said remaining wire elements.

3. A well screen comprising, in combination: a plurality of elongated support bars disposed in spaced parallel relation and arranged in a tubular array, a pair of end fittings, there being one end fitting disposed at each end of said array of support bars, said end fittings being fixedly attached to the opposite ends of said support bars in said array whereby said support bars support said end fittings in spaced relation, a plurality of elongated wire elements, said wire elements being disposed in spaced relation in the spaces between said support bars and in parallel relation to said support bars and cooperating with said support bars to form a tubular screen having axially extending slots in the exterior surface thereof, said wire elements each having a radial thickness in said screen less than the radial thickness of said support bars, and a plurality of annular ribbon elements surrounding said tubular screen, each said ribbon element contacting each of said support bars and wire elements of said tubular screen and being welded fixedly thereto whereby said support bars support said wire elements in fixed relation through the medium of said ribbon elements, said ribbon elements constituting the sole means interrupting the continuity of said axially extending slots.

4. A well screen according to claim 3 wherein each said end fitting has an annular surface occupying a plane normal to the axis of said tubular screen and overlying the adjacent ends of said support bars and wire elements so as to shield said adjacent ends.

5. A well screen according to claim 3 wherein each said fitting has an annular shoulder projecting inwardly of said tubular screen, the outer periphery of each said shoulder substantially matching the interior contour of said tubular screen as defined by said wire elements whereby the ends of said wire elements are braced against radial inward loads by said shoulder, said support bars having a greater radial projection into the interior of said tubular screen than said wire elements and being notched at the ends thereof to receive said shoulder, the end portions of said support bars where notched seating against said shoulders.

6. A well screen comprising, in combination: a plurality of elongated wire elements and means supporting said wire elements in a tubular array wherein said wire elements extend parallel to the longitudinal axis of said array and cooperate to define elongated axially extended slots in the outer surface of said array, said supporting means including a first fitting disposed at one end of said array and adapted for attachment to a well pipe and a second fitting disposed at the opposite end of said array, a portion of said wire elements having an extended thickness in the direction normal to the outer surface of said array, the ends of said portion of wire elements being fixedly attached to said first and second fittings, and an annular ring disposed in the interior of said tubular array and occupying a plane substantially normal to the axis of said array, said annular ring having a plurality of radially extending slots in the outer periphery thereof, there being one said radially extending slot receiving the extended thickness of each of said portion of wire elements, the outer periphery of said annular ring intermediate said radially extending slots contacting each of the remainder of said wire elements so as to brace said remaining wire elements against radially inward loads.

7. A well screen according to claim 6 wherein said second fitting is a driving point.

8. A well screen according to claim 6 wherein the periphery of said annular ring intermediate the radially extending slots therein has a plurality of circumferentially spaced notches, there being one notch receiving each of said remaining wire elements and thereby fixing the separation between said remaining wire elements.

References Cited by the Examiner

UNITED STATES PATENTS

| | | | |
|---|---|---|---|
| 304,617 | 9/84 | Cook | 166—234 |
| 415,607 | 11/89 | Boone et al. | 166—234 X |
| 1,886,121 | 11/32 | Records | 166—234 X |
| 2,046,456 | 7/36 | Johnson | 175—19 |
| 2,101,537 | 12/37 | Every | 166—234 |
| 2,155,719 | 4/39 | Layne | 166—231 X |
| 2,346,647 | 4/44 | Bennison | 166—234 X |
| 2,346,885 | 4/44 | Williams et al. | 166—234 |

FOREIGN PATENTS 537,088  10/31  Germany.

CHARLES E. O'CONNELL, *Primary Examiner.*